United States Patent Office 3,833,610
Patented Sept. 3, 1974

3,833,610
3,5-DIOXO-2,3,5,6-TETRAHYDRO-(4H)-PYRANE AND THIOPYRANE-4-CARBOXANILIDES
Goetz E. Hardtmann, Florham Park, N.J., assignor to Sandoz-Wander, Inc., Hanover, N.J.
No Drawing. Continuation-in-part of abandoned application Ser. No. 246,351, Apr. 21, 1972. This application Mar. 5, 1973, Ser. No. 338,302
Int. Cl. A61k 27/00; C07d 65/04, 7/04
U.S. Cl. 260—327 TH                    9 Claims

ABSTRACT OF THE DISCLOSURE

Disclosed are compounds of the class of 3,5-dioxo-2,3,5,6-tetrahydro-(4H)-pyrane and -thiopyrane-4-carboxanilides e.g. 3,5-dioxo-2,3,5,6-tetrahydro-(4H)-thiopyrane-4-carboxanilide, which exhibit biological activity and are useful, for example, as anti-inflammatory and anti-fungal agents. The compounds may be prepared by reacting 3,5-dioxo-2,3,5,6-tetrahydro-(4H)-pyrane or thiopyrane with a phenyl isocyanate in the presence of a base.

---

This application is a continuation-in-part of copending application Ser. No. 246,351, filed Apr. 21, 1972, now abandoned.

The invention relates to chemical compounds which are 3,5-dioxo-2,3,5,6-tetrahydro-(4H)-pyrane and thiopyrane-4-carboxanilides, to the preparation of said compounds and the methods and compositions utilizing the biological activities of such compounds.

The compounds of the invention may be represented by the following structural formula I:

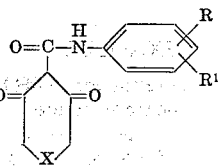

in which X is oxygen or sulfur and each of R and $R^1$ is independently hydrogen, halo of atomic weight of from 18 to 80, i.e. fluoro, chloro or bromo, lower alkyl of 1 to 4 carbon atoms, lower alkoxy of 1 to 4 carbon atoms, trifluoromethyl or nitro, provided that R and $R^1$ may not both be a tertiary branched substituent.

The compounds of the Formula I may be conveniently prepared by reacting a compound of the Formula II:

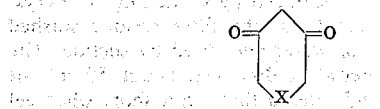

in which X is as above defined, with a compound of the Formula III;

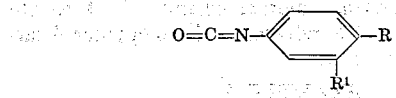

in which R and $R^1$ are as above defined.

The preparation of Compounds I from Compounds II and III is suitably carried out at temperatures in the range of from 20° C. to 100° C., preferably 35° C. to 80° C. in an inert organic solvent and in the presence of a base. Any of several well-known conventional solvents may be employed including the ethers of both cyclic and acyclic type, e.g. diethyl ether, dioxane and tetrahydrofuran, preferably the latter. The base is desirably an organic base such as a tertiary amine, preferably triethylamine. Inorganic bases such as potassium carbonate may be also used. The reaction product of the Formula I may be isolated and recovered from the resulting reaction mixture by working up by conventional procedures.

The compounds of the Formula II and III are either known per se or may be prepared from known materials by established procedures. A suitable literature reference for compounds of the Formula II is J.A.C.S. 77, 4241 (1955).

The compounds represented by formula I above are useful as antimocribal agents, i.e. as anti-bacterial and anti-mycotic agents, as indicated by their activity at concentrations of 1 to 100 micrograms/ml. in vitro against the organisms Staphylococcus aureus, Salmonella typhimurium, Escherichia coli, Proteus vulgaris, Candida, albicans, and Beta hemolyticus streptococcus Lancefield group A using conventional serial dilution tests. Particularly potent effects are shown by the compound of Example 1 hereinafter against candida albicans, e.g. effective concentrations can be as low as 3–15 micrograms per milliliter.

For use in the treatment of microbial infection the compounds I may be administered orally, parenterally or topically, as such or admixed with conventional pharmaceutical carriers.

The anti-micorbial effective dosage utilized in the treatment of microbial infection will vary depending upon the compound employed, the condition being treated, and the mode of administration. In general, satisfactory results are obtained when the compounds of the formula I are administered internally for systemic use at a daily dosage of about 0.5 mg. to about 100 mg. per kilogram of animal body weight. This daily dosage is preferably administered 2 to 4 times a day, or in sustained release form. For most large mammals the total daily dosage is from about 30 mg. to about 4 gm. Dosage forms suitable for internal use comprise about 7 mg. to about 2.0 g. of active compound in intimate admixture with a solid or liquid pharmaceutically acceptable carrier or diluent.

The compounds I except those in which R and $R^1$ are nitro or trifluoromethyl are also useful as anti-inflammatory agents as indicated by an inhibition of Carrageenan induced edema in rats and a reduction in foot volume and an improvement in grip strength in the adjuvant arthritis test in rats using Mycobacteria butyricum in Freund's adjuvant, both on oral administration (15–150 mg./kg.). For such use, the compounds may be combined with a pharmaceutically acceptable carrier, and such other conventional adjuvants as may be necessary, and administered orally or parenterally in a conventional manner. The dosage administered will, of course, vary depending upon the compounds used, the severity of the condition being treated, and the mode of administration. However, in general, satisfactory results are obtained when administered at a daily dosage of from about 3.0 milligrams to about 150 milligrams per kilogram of body weight, preferably given in divided doeses 2 to 4 times a day, or in sustained release form. For most mammals the administration of from about 200 milligrams to about 1600 milligrams of the compound per day provides satisfactory results and dosage forms suitable for internal administration comprise from about 50 milligrams to about 800 milligrams of the compound in admixture with a solid or liquid pharmaceutical carrier or diluent.

The compounds of the formula I having the formula IA:

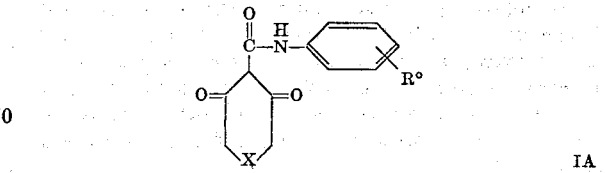

in which R° is halo of atomic weight of from 35 to 80 or trifluoromethyl and in which X is as above defined, are also useful as hypolipidemic agents, i.e. in the treatment of lipidemia, as indicated by tests on a group of white rats which are given typically 10–200 mg. per kg. of body weight per diem of the compound orally, for six days, followed by extraction with isopropanol of serum or plasma after anesthetizing the rats with sodium hexobarital, and then noting the cholesterol and triglyceride contents which are lowered compared to those of a control group. The cholesterol and triglyceride contents are determined by the methods described by Lofland, H. B., Anal. Biochem. 9:393 (1964): (Technicon method N 24a): and Kessler, G., and Lederer, H. Technicon Symposium, Mediad Inc., New York, pages 345–347 (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered orally at a daily dosage of from about 1 milligrams to about 200 milligrams per kilogram of animal body weight, preferably given in divided doses, 2 to 4 times a day, or in sustained release form. For most mammals the total daily dosage is from about 80 milligrams to about 1500 milligrams of the compound, and the dosage forms suitable for internal use comprise from about 20 milligrams to about 750 milligrams of the compound in intimate admixture with a solid or liquid pharmaceutically acceptable carrier or diluent.

For above usages, the compounds I may be administered orally in such forms as tablets, dispersible powders, granules, capsules, syrups, and elixirs; parenterally as solutions, suspensions, dispersions, emulsions, and the like, e.g., a sterile injectable solution such as an aqueous suspension and topically as solutions, salves and the like. These pharmaceutical preparations may contain 0.5% up to about 90% of the active ingredient in combination with the carrier or adjuvant, more usually between 3% and 50% by weight. Such compositions may be prepared according to any method known in the art for the manufacture of pharmaceutical compositions, and such compositions may also contain one or more conventional adjuvants, such as sweetening agents, flavoring agents, coloring agents and preserving agents, in order to provide an elegant and palatable preparation.

Tablets and capsules containing the ingredients indicated below may be prepared by conventioned techniques and are useful in treating microbial infection and inflammation in mammals at a dose of one tablet or capsule 2 to 4 times a day.

| Ingredients | Weight (mg.) | |
|---|---|---|
| | Tablet | Capsule |
| 3,5-dioxo-2,3,5,6-tetrahydro-(4H)-thiopyrane-4-carboxanilide | 100 | 100 |
| Tragacanth | 10 | |
| Lactose | 197.5 | 250 |
| Corn starch | 25 | |
| Talcum | 15 | |
| Magnesium stearate | 2.5 | |

The following injectable pharmaceutical composition is formulated with the indicated amount of active agent using conventional techniques. Such injectable suspension represents a formulation useful as unit doses and may be administered particularly in the treatment of microbial infection, and is typically administered once or twice a day.

| | Weight (mg.) sterile injectable suspension |
|---|---|
| 3,5 - dioxo - 2,3,5,6 - tetrahydro-(4H)-thiopyrane-4-carboxanilide | 50 |
| Sodium carboxy methyl cellulose U.S.P. | 1.25 |
| Methyl cellulose | 0.4 |
| Polyvinylpyrrolidone | 5 |
| Lecithin | 3 |
| Benzyl alcohol | 0.01 |
| Buffer agent to adjust pH for desired stability, q.s. | |
| Water for injection, q.s. to 1 ml. | |

Capsules containing the ingredients indicated below may be prepared by conventional techniques and are useful in treating lipidemia in mammals on administration of one capsule 2 to 4 times a day.

| Ingredients: | Weight (mg.) |
|---|---|
| 3,5 - dioxo - 2,3,5,6-tetrahydro-(4H)-thiopyrane-4 - m - trifluoromethylcarboxanilide | 100 |
| Lactose | 250 |

It will be evident to those skilled in the art that the compounds of the formula I of the invention may have and may be expressed by the alternate structural formula IA:

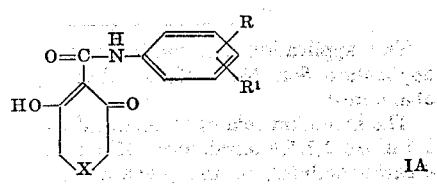

The following examples show representative compounds encompassed within the scope of this invention and the manner in which such compounds are prepared. However, it is to be understood that the examples are for purposes of illustration only.

EXAMPLE 1

3,5-Dioxo-2,3,5,6-tetrahydro-(4H)-thiopyrane-4-carboxanilide

A mixture of 5.5 g. of 3,5-Dioxo-2,3,5,6-tetrahydro-(4H)-thiopyrane, 5.2 g. of phenyl-isocyanate and 4.6 g. of triethylamine is heated in 90 ml. of tetrahydrofuran for 2 hours under reflux. After cooling the mixture is poured over 700 ml. of 2N hydrochloric acid and the oil which separates is crystallized by scratching. The crystalline material is filtered off, the filter residue washed 3 times with 100 ml. of water and dried by suction. The crude crystalline material is dissolved about 50 ml. of methylene chloride and filtered through a short silica gel Column. The material is eluted with chloroform-methanol (98:2). Following evaporation the residual oil is crystallized from methylene chloride/ethanol (1:5) to obtain 3,5 - dioxo-2,3,5,6-tetrahydro-(4H)-thiopyrane-4-carboxanilide, m.p. 83–85° C.

EXAMPLE 2

Following essentially the procedure of Example 1 and substituting the appropriate corresponding starting materials there are obtained the following additional compounds of the invention:

(A) 3,5-dioxo-2,3,5,6-tetrahydro-(4H)-pyrane-carboxanilide.
(B) 3,5-dioxo-2,3,5,6-tetrahydro-(4H)-pyrane-4-p-chlorocarboxanilide.
(C) 3,5 - dioxo - 2,3,5,6 - tetrahydro - (4H) - thiopyrane-4-p-chlorocarboxanilide, m.p. 150–153° C. (from ethanol.

(D) 3,5-dioxo-2,3,5,6-tetrahydro-(4H)-thiopyrane-4-p-methoxycarboxanilide.
(E) 3,5-dioxo-2,3,5,6-tetrahydro-(4H)-thiopyrane-4-m-methylcarboxanilide.
(F) 3,5-dioxo-2,3,5,6-tetrahydro-(4H)-thiopyrane-4-p-fluorocarboxanilide, m.p. 115–118° C.
(G) 3,5-dioxo-2,3,5,6-tetrahydro-(4H)-thiopyrane-4-m-chlorocarboxanilide, m.p. 115–118° C.
(H) 3,5-dioxo-2,3,5,6-tetrahydro-(4H)-thiopyrane-4-p-methylcarboxanilide, m.p. 85–89° C.
(I) 3,5-dioxo-2,3,5,6-tetrahydro-(4H)-thiopyrane-4-m-methylcarboxanilide.
(J) 3,5-dioxo-2,3,5,6-tetrahydro-(4H)-thiopyrane-4-o-trifluoromethylcarboxanilide, m.p. 94–97° C.
(K) 3,5-dioxo-2,3,5,6-tetrahydro-(4H)-thiopyrane-4-o,p-dimethoxycarboxanilide, m.p. 171–174° C.

EXAMPLE 3

3,5-dioxo-2,3,5,6-tetrahydro-(4H)-thiopyrane-4-m-trifluoromethylcarboxanilide

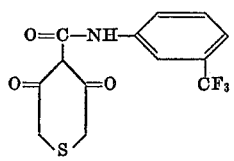

A solution of 8 g. of thiopyrane-1,3-dione dissolved in 100 ml. of tetrahydrofuran is treated with 11.7 g. of m-trifluoromethyl-phenylisocyanate and 7 g. of triethylamine and the mixture is refluxed for 3 hours. After cooling the mixture is poured on 200 ml. ice cold 2N hydrochloric acid and the precipitate which forms is filtered off and washed (on the filter) 3 times with water. The filter residue is dried by air-suction and then dissolved in 200 ml. of methylene chloride. The solution is subsequently dried over Na₂SO₄, treated with activated charcoal, filtered and evaporated to 50 ml. volume. On exchange of the solvent by ethanol crystallization occurs and the product is removed by filtration, the filter residue washed once with ethanol and twice with pentane and dried to obtain 3,5-dioxo-2,3,5,6-tetrahydro-(4H)-thiopyrane-4-m-trifluoromethylcarboxanilide, m.p. 81–84° C,

What is claimed is:

1. A compound of the formula:

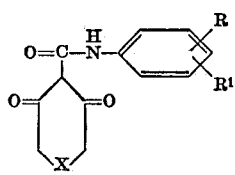

in which X is oxygen or sulfur and
each of R and R¹ is independently hydrogen, halo of atomic weight of from 18 to 80, alkyl of 1 to 4 carbon atoms, alkoxy of 1 to 4 carbon atoms, trifluoromethyl or nitro, provided that R and R¹ may not both be a tertiary branched substituent.

2. A compound of claim 1 in which X is sulfur.
3. The compound of claim 2 in which each of R and R¹ is hydrogen.
4. The compound of claim 2 in which R is chloro and R¹ is hydrogen.
5. A compound of claim 1 in which X is oxygen.
6. The compound of claim 5 in which each of R and R¹ is hydrogen.
7. A compound of claim 1 in which each of R and R¹ is independently hydrogen, halo, alkyl or alkoxy in the meta- and para-positions.
8. A compound of claim 1 having the formula:

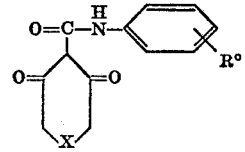

in which R° is halo of atomic weight of from 35 to 80 or trifluoromethyl.

9. The compound of claim 8 in which X is sulfur.

References Cited
FOREIGN PATENTS

| | | | |
|---|---|---|---|
| 1,111,542 | 5/1968 | Great Britain | 260—327 |
| 771,060 | 2/1972 | Belgium | 260—557 |

JOHN D. RANDOLPH, Primary Examiner
C. M. S. JAISLE, Assistant Examiner

U.S. Cl. X.R.
260—345.7; 424—275, 283